United States Patent
Szymanski et al.

[11] Patent Number: 6,148,081
[45] Date of Patent: *Nov. 14, 2000

[54] SECURITY MODEL FOR INTERACTIVE TELEVISION APPLICATIONS

[75] Inventors: Steven Szymanski, San Jose; Jean Rene Menand; Vincent Dureau, both of Palo Alto, all of Calif.; Suresh N. Chari, Elmsford, N.Y.

[73] Assignee: OpenTV, Inc., Mountain View, Calif.

[*] Notice: This patent is subject to a terminal disclaimer.

[21] Appl. No.: 09/196,964

[22] Filed: Nov. 20, 1998

Related U.S. Application Data

[63] Continuation-in-part of application No. 09/087,386, May 29, 1998, Pat. No. 6,038,319.

[51] Int. Cl.[7] .................................................. H04L 9/32
[52] U.S. Cl. ........................................... 380/33; 455/13
[58] Field of Search .............................. 380/5, 7, 10, 23, 380/233, 236, 235, 20, 259, 33; 348/3; 455/13

[56] References Cited

U.S. PATENT DOCUMENTS

| | | |
|---|---|---|
| 4,995,080 | 2/1991 | Bestler et al. . |
| 5,046,090 | 9/1991 | Walker et al. ............................. 380/5 |
| 5,586,260 | 12/1996 | Hu . |
| 5,625,693 | 4/1997 | Rohatgi et al. . |
| 5,920,626 | 7/1999 | Durden et al. ............................ 380/10 |

FOREIGN PATENT DOCUMENTS

| | | |
|---|---|---|
| 97/24832 | 7/1997 | WIPO . |
| 98/00972 | 1/1998 | WIPO . |

*Primary Examiner*—Tod R. Swann
*Assistant Examiner*—Todd Jack
*Attorney, Agent, or Firm*—B. Noël Kivlin; Conley, Rose & Tayon

[57] ABSTRACT

A system and method implemented in an interactive television system for restricting or controlling the access rights of interactive television applications and carousels. The system broadcasts modules from a broadcast station to a plurality of receiving stations, which execute applications containing the modules. In one embodiment, the applications utilize a credential consisting of a producer identification number (ID) and an application ID for each of the grantor and grantee applications, an expiration date, a set of permission data, a producer certificate and a signature. An application requesting access and a carousel granting access may be identified by respective producer and application IDs. The credential utilizes public key encryption to ensure the integrity of the credential. The producer and application IDs may be replaced with wildcards so that rights may be granted to a group of producers or applications.

26 Claims, 4 Drawing Sheets

SECURITY MODEL FOR INTERACTIVE TELEVISION APPLICATIONS

This application is a continuation-in-part application of application Ser. No. 09/087,386, filed May 29, 1998, now U.S. Pat. No. 6,038,319, issued Mar. 14, 2000, entitled "Security Model for Sharing in Interactive Television Applications."

BACKGROUND OF THE INVENTION

1. Field of the Invention

The invention relates to interactive television systems and more particularly to means for enforcing security in regard to interactive television applications which may access other modules or take some action which is restricted.

2. Description of the Related Art

Interactive television systems enable television sets to be used to provide various new means for providing services to viewers. Interactive television systems are capable of displaying text and graphic images in addition to typical video program streams. Interactive television systems are also capable of registering viewer actions or responses. Proposed features of interactive television include a variety of marketing, entertainment and educational capabilities such as allowing a user to interact with televised programs by ordering advertised products or services, competing against contestants in a game show, or requesting specialized information regarding particular programs.

Typically, a broadcast service provider generates an interactive television signal for transmission to a viewer's television. The interactive television signal includes an interactive portion consisting of application code or control information, as well as an audio-video portion consisting of a television program. The broadcast service provider combines the audio-video and interactive portions into a single signal for transmission to a receiver connected to the user's television. The signal is generally compressed prior to transmission and transmitted through typical broadcast channels, such as cable television (CATV) lines or direct satellite transmission systems.

The interactive functionality of the television is controlled by a set-top box connected to the television. The set-top box receives the signal transmitted by the broadcast service provider, separates the interactive portion from the audio-video portion and decompresses the respective portions of the signal. The set-top box uses the interactive information, for example, to execute an application while the audio-video information is transmitted to the television. The set-top box may combine the audio-video information with interactive graphics or audio generated by the interactive application prior to transmitting the information to the television. The interactive graphics and audio may present additional information to the viewer or may prompt the viewer for input. The set-top box may provide viewer input or other information to the broadcast service provider via a modem connection.

Interactive television applications consist of one or more program modules. If the application has more than one module, the set of modules forming the application is typically self-contained. That is, all of the code needed by the application is in that set of modules. The first module is a directory module which identifies all of the modules which are part of the application. The entire set of modules, which is listed in the directory module, is transmitted via the broadcast channel to the set-top box and the application is executed. (The set of modules may be referred to as a carousel, as explained below.) If a first interactive television application has completed execution and a second is to be executed, the directory and other modules of the second application are transmitted to the set-top box and the second application is executed. The entire set of modules used by the second application are transmitted even though some of the modules might be identical to modules used by the first application.

It may be advantageous to design software applications in a modular fashion so that modules may be shared between applications. The advantages of modularity may include conserving the limited amount of memory in a set-top box which can be used for interactive applications, reducing the time required to download applications from a broadcast station to a set-top box or reducing the amount of application code which must be written by allowing modules to be shared. Because the components of an application may reside in different carousels, it would be desirable to ensure the security of the respective modules and accordingly restrict access to authorized modules.

It would also be advantageous to provide a mechanism for allowing applications to interact with each other in a controlled manner, even when they do not share modules. For example, if one application transfers control to another application and the second application stalls, the first application may need to terminate the second application in order to regain control. It would therefore be desirable to provide a system which can verify the first application's access rights and determine whether to allow the first application to take such an action. Further, it would be desirable to implement these features in a way that minimizes the overhead associated with the system.

SUMMARY OF THE INVENTION

The invention comprises a system and method for restricting or controlling the access rights of interactive television applications. ("Access rights" is used here to refer to the right of an application to share program modules, control other applications, use system resources or take some other action.) One embodiment of the invention provides means in an interactive television system to verify the credentials of certain applications which attempt to take actions which may affect other applications. The system is implemented in order to ensure the security, safety and authority of the respective applications with respect to certain operations. The system utilizes a credential consisting of various pieces of information to identify an application and its respective privileges, rights and restrictions.

In one embodiment, the credential contains a producer identification number (ID) and an application ID for the application, an expiration date, a list of rights, a producer certificate and a signature. The producer and application IDs uniquely identify the application. The list of rights identifies the application's ability to exercise restricted rights, such as accessing another application's modules or terminating the other application's execution. The restricted rights may pertain to any operation performed by applications in the system. The expiration date sets a time limit beyond which the credential is no longer valid. The credential utilizes public key encryption (described in more detail below) for security. The producer certificate is the producer's public key. The entire credential is signed with the producer's private key so that the integrity of the credential can be verified.

In one embodiment, a credential may be used to provide a mechanism by which a first application may grant permission to a second application to share its code or take an action with respect to the first application. The owner of the first application has an ID which identifies it in the credential. Likewise, the second application has an ID which is listed in the credential as the application being granted the permission. The owners of both the first and second applications have assigned specific IDs to the applications, each ID being unique among the applications of that owner. The owner also has its own ID which is unique among owners (producers). Any given application can therefore be identified by its owner and application IDs. Thus, any given application can grant particular permissions to a specific application owned by a specific owner. The producer and application IDs of the applications may be replaced with wildcards so that a single application may grant certain permissions to a group of owners or applications.

In one embodiment, the credential may be used to control the actions of a first application which do not affect other applications. For example, an application may attempt to access private, restricted data stored in a set-top box. The set-top box may be configured to allow access to the locations in memory corresponding to the restricted data only when presented with a valid credential indicating a right to access the data. In another embodiment, the system may be configured to restrict access to other system resources such as the return path to the broadcast station. The system may check an application's credential(s) before it begins execution or when access to the return path is requested. Access is permitted if a valid credential indicates permission to use the return path. The credentials may be used to control any number of functions of an application and there may be many variations in the implementation of the mechanism which is used to validate the credentials.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

One embodiment of the invention is described below. In this embodiment, an interactive television receiver accepts an audio-video-interactive signal via a broadcast channel such as direct satellite transmission. ("Direct" satellite transmission as used herein contemplates transmissions received by the interactive television receiver, more particularly by its antenna, directly from the satellite.) The audio-video-interactive signal contains television programs or similar audio-video content, as well as interactive content such as control signals or interactive applications. ("Broadcast" is used herein to refer to transmission of a single signal to all subscribing receivers.) The interactive television receiver is also configured to receive audio-video-interactive signals via a non-broadcast channel such as a modem. The interactive television receiver is configured to separate the audio-video content from the interactive content of the audio-video-interactive signal. The audio-video content is processed for display as a television program, while the interactive content is processed for execution by the receiver. The interactive content may enable the receiver to perform a variety of functions, including generating audio or graphics which are combined with the television program for display. If the interactive content comprises an application, the application may consist of several sub-components, or modules. The modules can contain any type of data, such as application code, raw data or graphical information.

The modules which form the interactive application usually belong to a single set of modules referred to as a carousel. A carousel can generally be defined as a set of modules which are owned by the same producer and have the right to access each other. The modules are referred to as a carousel because they are typically transmitted to the interactive television receiver in a cyclic manner. An application is a carousel which contains a "top-level" program.

It may be desirable to allow an application to access modules of another carousel (for sharing of data, transferring control of applications or other purposes). An application or module of one carousel can interact with modules of another carousel or with the interactive television system by employing "credentials." The credentials are sets of data which can be used to identify and verify the privileges and limitations of particular modules. The privileges and limitations may relate to whether a module is authorized to interact with the other modules or take some action which is otherwise restricted, such as accessing restricted areas of memory. The credentials may utilize wildcards to grant privileges to a number of modules without having to maintain a list of all the involved modules.

Figure 1:
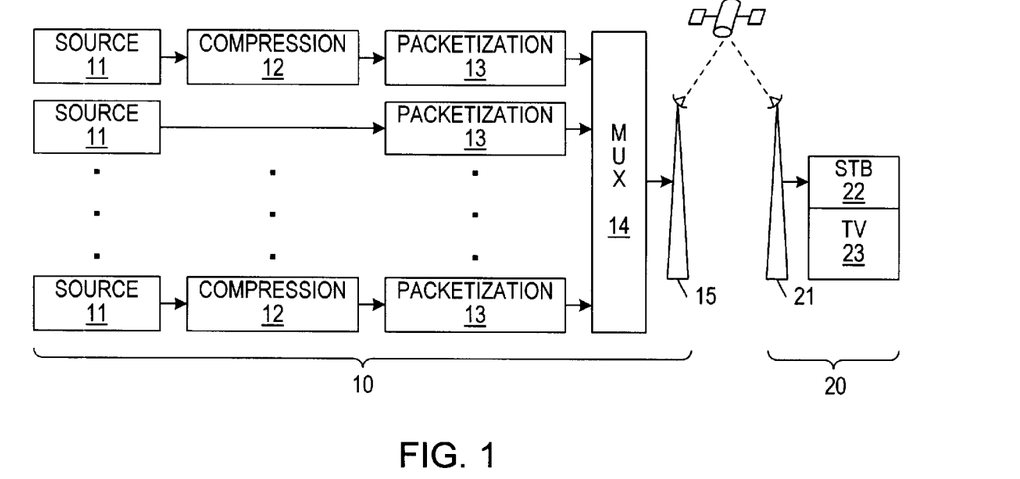
FIG. 1 is a block diagram illustrating the distribution of interactive television applications and television programs from their sources to a series of viewers.

Referring to FIG. 1, a block diagram illustrating the distribution of interactive television applications and television programs from their sources to a series of viewers is shown. Broadcast station 10 has several program sources 11. These sources may include remote broadcast network feeds, videotape recorders, computers, data storage devices, and the like. Sources 11 may provide interactive or control information, audio information and/or video information which is to be included in the interactive television signal. The information provided by sources 11 is typically compressed by compression units 12 in order to conserve bandwidth. Any of a number of compression algorithms, such as one of the Motion Picture Expert Group (MPEG) compression standards, may be used. The choice of an appropriate compression algorithm will depend on the type of information to be compressed and the transmission medium, among other things. Time stamps may also be added to, for example, synchronize associated audio and video signals. Some information may not be easily or effectively compressed, so some of the information may be routed directly from the source to packetization unit 13 without compressing the information. Packetization units 13 accept the compressed (or uncompressed) information and format it into packets for transmission over the broadcast channel. The packetization of the information will be described in more detail below. The packets are fed into multiplexing unit 14, which intersperses the packets prior to transmission. The interspersed packets are then broadcast to the receiving stations 20. (Although only one receiving station is shown in the figure, it is contemplated that the audio-video-interactive signal is broadcast to a group of subscribing receiving stations.) In the figure, the audio-video-interactive signal is depicted as being transmitted via satellite broadcast through antenna 15.

The broadcast signal is relayed by communications satellite 18 and received by receiving station 20. Although the figure illustrates a satellite transmission, it is contemplated that any broadcast medium (e.g., CATV or direct satellite transmission) may be used. (It should be noted that alternate embodiments of the invention may be implemented using point-to-point or other types of data distribution systems.) Receiving station 20 is contemplated to be one of a number of such stations which are subscribers of the broadcast service provider operating broadcast station 10. The broadcast signal is collected by receiving antenna 21 and fed to receiver 22, which in this embodiment is contemplated to be a set-top box. Set-top box 22 processes the packetized signal to reconstruct the television programs and interactive applications embodied in the signal. The reconstructed applications are executed in the set-top box, while the reconstructed television programs are passed to the television, where they are displayed. The interactive applications may generate graphics or audio which are combined with the television program prior to being displayed.

In addition to the broadcast channel between the broadcast station and receiving station, there may be other channels, such as a modem channel (which may also be referred to as an http, or hypertext transfer protocol, channel.) These types of channels serve two functions in the system: they allow the set-top box to provide feedback to the broadcast station; and they provide an alternate path for programs and applications from sources 12 to be delivered to receiving station 20.

Figure 2:
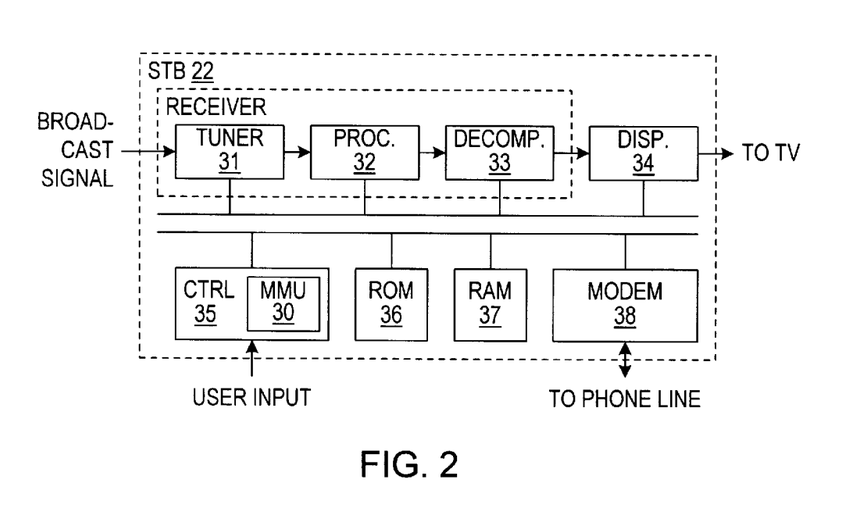
FIG. 2 is a block diagram of a set-top box used in one embodiment of the invention.

Referring to FIG. 2, a block diagram of a set-top box 22 is shown. The broadcast signal is received and fed into tuner 31. Tuner 31 selects the channel on which the broadcast audio-video-interactive signal is transmitted and passes the signal to processing unit 32. (Tuner 31 may be replaced by other means, all collectively referred to herein as input ports, for receiving signals from various signal sources.) Processing unit 32 demultiplexes the packets from the broadcast signal if necessary and reconstructs the television programs and/or interactive applications embodied in the signal. The programs and applications are then decompressed by decompression unit 33. The audio and video information associated with the television programs embodied in the signal is then conveyed to display unit 34, which may perform further processing and conversion of the information into a suitable television format, such as NTSC or HDTV audio/video. Applications reconstructed from the broadcast signal are routed to random access memory (RAM) 37 and are executed by control unit 35.

Control unit 35 may include a microprocessor, microcontroller, digital signal processor (DSP), or some other type of software instruction processing device. RAM 37 may include memory units which are static (e.g., SRAM), dynamic (e.g., DRAM), volatile or non-volatile (e.g., FLASH), as required to support the functions of the set-top box. When power is applied to the set-top box, control unit 35 executes operating system code which is stored in ROM 36. The operating system code executes continuously while the set-top box is powered in the same manner the operating system code of a typical personal computer (PC) and enables the set-top box to act on control information and execute interactive and other applications. The set-top box also includes modem 38. Modem 38 provides both a return path by which viewer data can be transmitted to the broadcast station and an alternate path by which the broadcast station can transmit data to the set-top box.

Although the term "set-top box" is used herein, it is understood that this term refers to any receiver or processing unit for receiving and processing a transmitted signal and conveying the processed signal to a television or other monitor. The set-top box may be in a housing which physically sits on top of a television, it may be in some other location external to the television (e.g., on the side or back of the television or remotely located from the television), or it may be incorporated into the television itself. Set-top box 22 serves to demodulate the signal received from broadcast station 10 and to separate the components of the signal, such as different television programs and interactive applications. Similarly, television 23 may be a television or a video monitor employing any suitable television format (e.g., NTSC or HDTV), or it may be replaced by other devices, such as a video recorder.

The receiving station is operatively connected to the broadcast station by a broadcast channel. This broadcast channel could utilize various transmission media and is contemplated to include media such as coaxial cable and free space (e.g., as used for direct satellite transmissions.) The broadcast channel forms a transmission path between the broadcast station and the receiving station. The broadcast station and receiving station are also connected by a return path. The return path typically consists of a pair of modems, one in the receiving station and one in the broadcast station, each connected to a standard telephone line. Other means for establishing a return path, e.g., using a portion of the bandwidth of the transmission path, are also contemplated.

Figure 3:
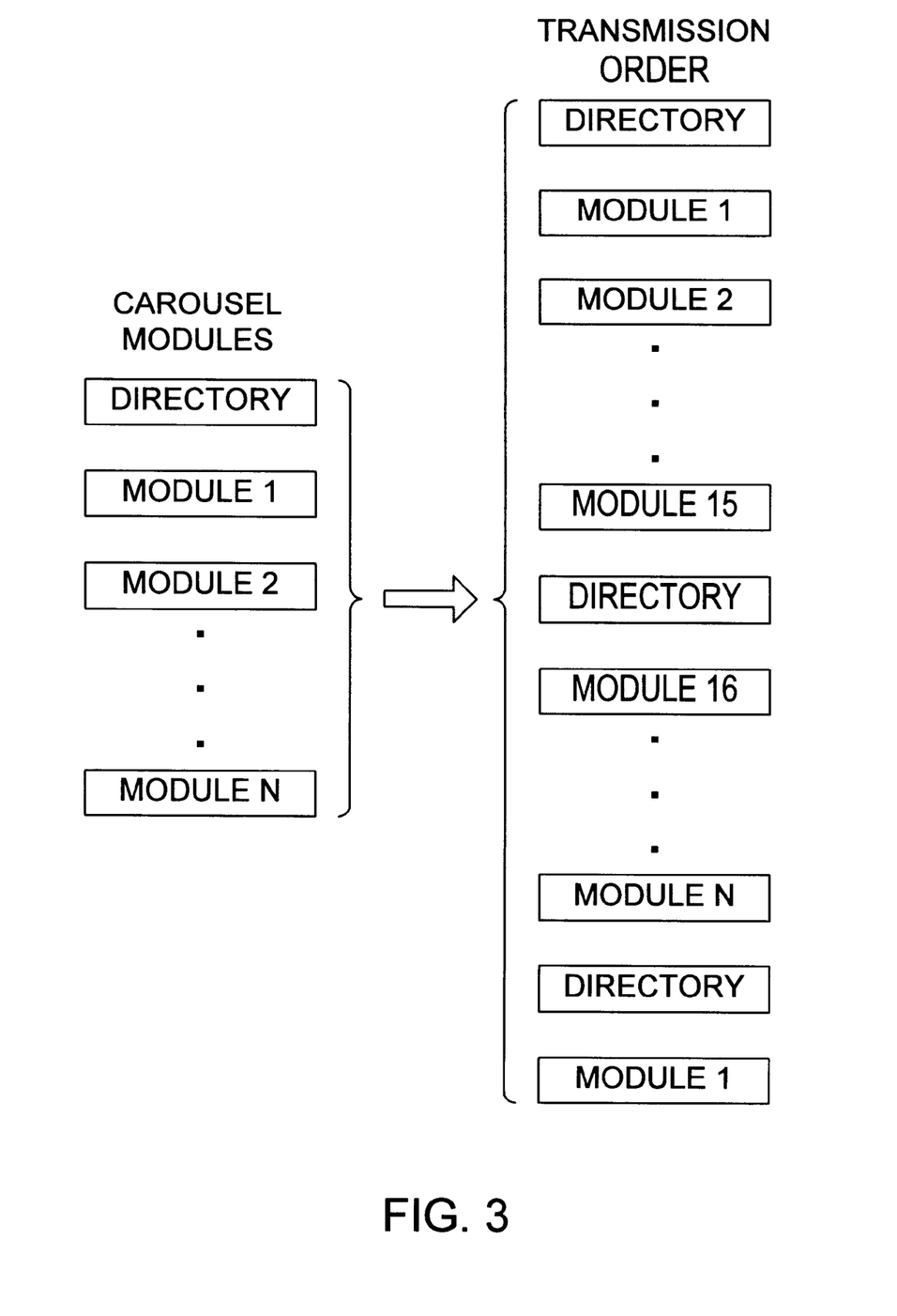
FIG. 3 is an illustration of the component modules of a carousel and the transmission order of the modules in one embodiment of the invention.

Referring to FIG. 3, an application or carousel consists of a series of modules, one of which is a directory module. The directory module has a unique identifier so that it can be identified during transmission without further information. The directory module contains an entry for each of the modules in the application and any module which does not have a corresponding entry in the directory module is not recognized by the application. The directory module contains enough information to allow the interactive television receiver to access all of the parts (i.e., modules) of the application which may be necessary for execution of the program. The directory module must be accessed before the other modules of the application so that the remainder of the modules can be properly interpreted. The directory module may be transmitted several times during the cycle in which the modules of the application are transmitted in order to ensure that it is available for essentially random access to the other modules.

The directory modules of all the applications have a common format. The format consists of three parts: a portion having fixed-length components; a portion having variable-length components; and a portion having certification information. The fixed-length portion contains data on the application and each of the modules in the application. The variable-length portion contains string data on the module names and the hash of the modules. The certification portion contains the producer certificate and directory signature.

In one embodiment, an application includes at least one module which is downloaded and executed automatically. Other modules containing data or additional code may not be needed immediately, so they may be downloaded after execution of the application begins. The downloading of these modules may be subject to timing constraints, however, so the interactive television system is configured to take these constraints into account and deliver the modules in a timely manner. If necessary, one of these modules may be multiplexed with other modules or data to be sure it is received when needed.

Figure 4:
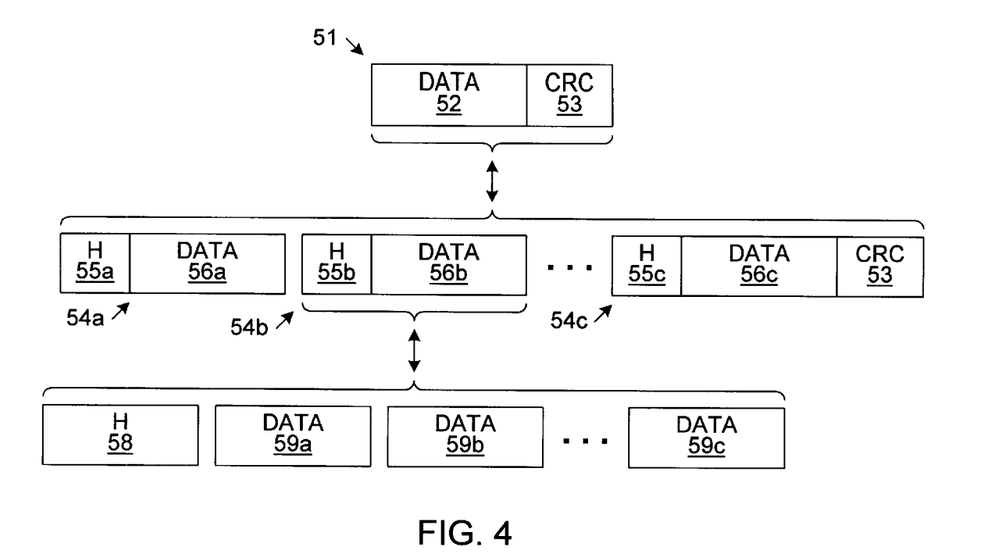
FIG. 4 is a block diagram illustrating the manner in which the data comprising a module is packetized in one embodiment of the invention.

Referring to FIG. 4, each of the modules 51 has a data segment 52 and a CRC segment 53. The data segment 52 of the directory module is described above. The data segment 52 of the remainder of the modules can contain any type of data, such as application code or raw data. The CRC segment 53 of each of the modules is used for error control and is computed for the entire module 51. Each of the modules 51 has a unique identifier.

Before the modules 51 are transmitted, they are formatted into transmission units 54. For the purposes of discussion, items referenced by the same number but different letters (e.g., 54a, 54b, 54c) will be collectively referred to by the number only (e.g., 54). Each of the transmission units 54 contains header information 55, which uniquely identifies that transmission unit 54 within the stream of transmission units, and data 56 which comprises a portion of the module being transmitted. The header 55 contains information such as the module ID, module offset and size, which allow the transmission units 54 to be reconstructed into a complete module 51. The transmission units 54 comprising a particular module 51 may be interleaved with other transmission units 54 in the transmission stream. The last transmission unit 54 for a module 51 carries the CRC 53.

The format of the transmission units 54 is dependent upon the transmission medium, but typically employs a series of packets of fixed length (the last packet may be padded to obtain the proper length.) The first packet 58 in the series carries the header information for the transmission unit 54. This header packet 58 is a special packet which can generate an interrupt in the CPU and which contains information to enable the CPU to determine whether the module 51 should be decoded and where it should be loaded into memory. The header packet 58 in a direct satellite transmission utilizes an auxiliary type packet which can generate an interrupt. The remainder of the packets 58 in a direct satellite transmission utilize a basic type packet which simply carries the transmission unit data.

The audio-video-interactive transmission from the broadcast station to the interactive television receiver comprises a series of transmission units. The transmission units which form a given module are typically time multiplexed with other information. This information may consist of transmission units of another module or compressed audio or video. The transmission units which are received by the interactive television receiver are reconstructed into their respective application modules.

Figure 5:
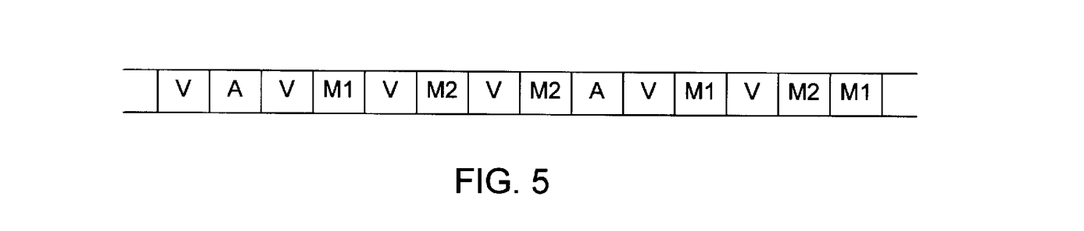
FIG. 5 is a diagrammatic representation of the signal transmitted from the broadcast station to a receiving station in one embodiment of the invention.

Referring to FIG. 5, a diagrammatic representation of the signal transmitted from broadcast station 10 to receiving station 20 is shown. The packets of several program sources may be multiplexed into a single transmission stream if necessary. These packets may contain data for various applications or television programs. The illustrated transmission stream includes audio (A) and video (V) packets of a television program, as well as packets of two interactive application modules (M1, M2.) The packets are formatted as explained above to enable reconstruction of the packets into the respective programs and modules. It should be noted that several modules can be simultaneously transmitted by combining their packets in the transmission signal. The figure illustrates the time multiplexing of the packets of the modules and the television program. The modules need not belong to the same carousel to be transmitted together. It can be seen from the figure that there are typically more packets of video data for a particular television program than audio data for that program as a result of the greater amount of video data which typically must be transmitted.

The broadcast signal is received by set-top box 22. Set-top box 22 may also have a modem connection for receiving an http signal. Set-top box 22 is contemplated to include a module management unit which is configured to detect packets corresponding to modules which are required for execution of an interactive television application. The modules are not necessarily required to begin execution of the respective application, but may be requested by the application after it begins execution.

Set-top box 22 demultiplexes the packets, separating the packets containing module data from packets containing audio and video for television programs. The module management unit detects module packets and determines whether these packets correspond to modules needed by the executing application. The set-top box then reconstructs the modules from the corresponding packets and reconstructs the television programs from the packets containing the associated audio and video data. As explained above, the modules are stored in RAM 37, where they are available for use by applications executing in the control unit 35.

The modules within a given carousel are generally created by a single producer who intends the modules to have access to each other. If there is a need for one of the modules to take some action with respect to another of the modules, it is assumed that the first module has the appropriate permissions. If there should be restrictions on the first module's actions, it is the responsibility of the programmer to enforce those restrictions. There is therefore typically no need for a security mechanism to restrict access between these modules. As pointed out above, however, applications may be designed to interact with modules which belong to other carousels, or they may be designed to take some action which is not allowed to be taken by all modules. It is therefore desirable to implement a security device which controls, for purposes such as system and application safety, whether modules of one carousel are allowed to perform restricted operations. (Although the modules may actually perform the restricted operations, access rights are generally granted on a per-carousel basis, so the following description relates to grants of rights to carousels.)

A module may obtain permission to perform a restricted operation by means of a credential. A credential is a collection of information which typically identifies the carousel and can be taken as proof of the module's authorization to perform the restricted operation. The restricted operation may be any one of the operations performed by applications in the interactive television system. For example, the operation may be one in which an application suspends or resumes execution of another application, hides or shows the display generated by the other application, or sends messages to the other application. These examples are intended only to illustrate some of the rights which can be granted, and are not intended to be an exhaustive list.

In one embodiment, the producer of a carousel may create a credential which is intended to allow selected applications to initiate or terminate execution of the application stored in the carousel. For example, the carousel may comprise an electronic commerce application which allows interactive television users to make purchases via credit card transactions. Certain online shopping applications may be authorized to initiate the credit card transaction application in order to make purchases. These same applications, or possibly a different set of applications, may be authorized to terminate the credit card transaction application if it stalls or cannot complete the transaction. The applications which initiated the credit card application could thereby regain control and resume execution in spite of the inability to complete the credit card transaction.

In this example, the producer of the credit card application creates the credential and distributes the credential to other producers who he or she desires to have access to the credit card application (e.g., those who have licensed the use of the application.) The credential can be created by secure means so that it can be determined at run time whether the credential was in fact created by the producer of the credit card application (which may be referred to as the "grantor carousel".) For example, the credential can incorporate a certificate to enable authentication of the credential. The producers to whom the credential is distributed can incorporate the credential into their own carousels (which may be referred to as the "grantee carousels") which may need to initiate/terminate the credit card application. It is contemplated that the credential may be delivered to the system separately from the application(s) with which it is associated. The credential may be stored in the system so that the information embodied therein will be available upon receipt or execution of the application.

It should be noted that the credential is distinct from a certificate, which is normally used simply to authenticate the validity of an application itself and to identify the producer of the application. The system may imply certain rights and/or limitations which are associated with the producer of the application (for instance, only certain producers may be allowed to create applications which use the modem).

In one embodiment, certain applications may be allowed to run at the same time while others are prohibited from doing so. A credential may be used to control the simultaneous execution of the applications. The credential may contain data indicating one or more applications which are allowed to execute at the same time as a first application. If the first application is executing, an attempt to execute a second application may cause the system to check to the appropriate credential to determine whether the second application is permitted to execute at the same time. If the credential indicates that the second application is permitted to run simultaneously, the second application will be initiated. If not, the second application will not be initiated. In another embodiment, the credential may contain data indicating one or more applications which are not allowed to execute at the same time as the first application. In this instance, an attempt to execute the second application would cause the system to check the appropriate credential to determine whether the second application is prohibited from executing simultaneously. Initiation of the second application would then be permitted or prohibited, based on the data contained in the credential.

In one embodiment, the credential is presented by the grantee carousel to the interactive television system to verify that it is allowed to initiate/terminate the credit card application. The system allows this action to be taken upon verification of the credential and the corresponding right to initiate/terminate the application. The interactive television system verifies the credential by comparing the producer and application IDs specified in the credential to the credit card and grantee carousels. The system also verifies that the credential has not expired, as determined by an expiration date in the credential. It is contemplated that verification of the credentials may be performed either prior or subsequent to execution of the application which will request access to other carousels. In other embodiments, credentials may be transmitted to the system separately from the application. For example, a set-top box may be periodically loaded with a set of credentials which control the restricted accesses and operations for all of the applications executed in the set-top box.

In another embodiment, the restricted action may not involve interaction with another carousel or application. The restricted action may instead involve functions such as the use of system resources. For example, certain applications may be allowed to access restricted portions of the memory in the set-top box or transmit data to the broadcast station via the return path. In this case, the credential may be created by the broadcast service provider or the owner of the interactive television system. The credential may be distributed to the producers of applications for which access to the restricted system resources is authorized. Upon execution, the credential is presented to the interactive television system and access to the appropriate resources is allowed.

Before the credential structure is described, it should be noted that there are a variety of security systems which use "public key" encryption. Public key encryption systems may employ various encryption algorithms. One embodiment uses RSA (Rivest, Shamir & Adleman) and DES (Data Encryption Standard) algorithms. Public key encryption utilizes a pair of encryption keys, one of which is termed a private key and one of which is called a public key. The private key is kept secret by its owner, while the public key is made freely available. A message or other file which is encrypted with the public key can only be decrypted with the private key. Likewise, a file which is encrypted with the private key can only be decrypted with the public key. When a message is encrypted with one of the keys, it is converted into an apparently random set of characters. Thus, when a message encrypted with a public key is sent to the holder of the private key, the sender can be assured that, even if the message is intercepted, only the intended recipient (who holds the private key) can decrypt it and read the message. When a message is signed, rather than encrypted, the message remains in readable form, but an encrypted signature is appended to the message. While anyone who sees the message can read it, the signature can be used to verify that the message originated with the holder of the private key. Further, because the algorithm which encrypts the signature is dependent in part upon the message which precedes the signature, any changes to the message will cause the signature to be unverifiable. The signature can therefore be used to ensure that the message is unaltered.

Figure 6A:
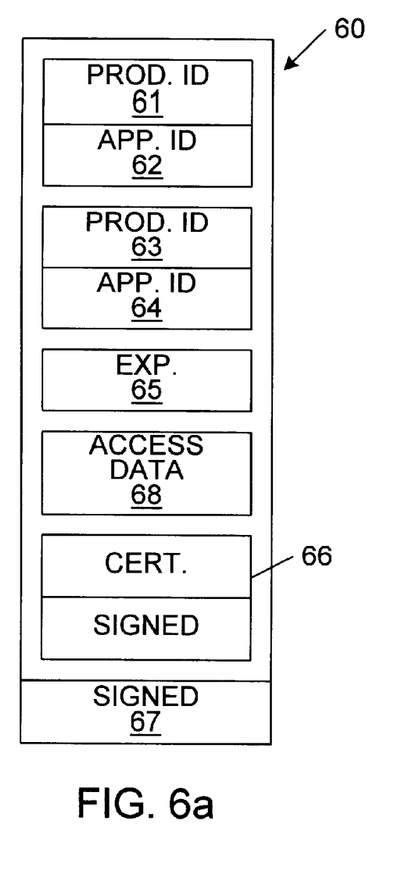
FIG. 6a is a block diagram illustrating the data structure of a credential used in one embodiment of the invention.

Referring to FIG. 6a, a diagram illustrating a simple credential data structure 60 is shown. This credential and the credential shown in FIG. 6b may be used for accesses between carousels as well for other restricted accesses. It should be noted that, although the following description focuses on inter-carousel accesses, these credentials can be used to identify any type or combination of restrictions and that the examples are illustrative rather than limiting.

Credential 60 includes grantor carousel information, grantee carousel information, an expiration date and a producer certificate. The credential is signed to enable verification of its authenticity. The grantor information includes the producer ID 61 and the carousel ID 62 for the grantor carousel. Likewise, the grantee information includes the producer ID 63 and the carousel ID 64 for the grantee carousel. Expiration date 65 can be included in the credential to limit the period for which the credential is valid. The illustrated credential also includes permission data 68. This data identifies the permissions which the grantee carousel has in regard to accessing restricted resources or performing other restricted operations. Permission data 68 may consist of any type of data suitable to identify the permissions of the carousel. In one embodiment, permission data 68 may comprise individual bits which affirm or negate particular permissions corresponding to predefined positions of the bits, while in another embodiment it may comprise a plurality of bytes explicitly identifying particular permissions. It should be noted that this data may be used to identify any rights or restrictions associated with a carousel and is not limited to resource access restrictions.

The credential contains a producer certificate 66. The producer certificate 66 is used to authenticate the credential and guarantee that it was created by the producer. Producer certificate 66 comprises the producer's public key, signed by some trusted party. (A trusted party is one who can vouch for the authenticity of the key. The trusted party's signature is encrypted and incorporated into the key.) The trusted party's key is well known. That is, it is stored in the system and is always available to the system. The entire credential 60 is then signed 67 with the producer's private key to ensure that none of the data in the credential 60 can be modified. A similar type of credential may be used by the broadcast service provider to allow receiving stations to control the functions of modules delivered by the broadcast service provider.

It is apparent that the use of a single credential for each instance of an application requiring access to a carousel can result in a very large number of credentials which may need to be maintained by a grantee carousel. If a carousel may require access to many other carousels of other producers, one credential would be required for each of these carousels. Creating and maintaining such a large number of credentials may also create a need for a great deal of coordination between producers. The credentialing system can therefore create substantial overhead which may outweigh the security benefits which it provides.

Figure 6B:
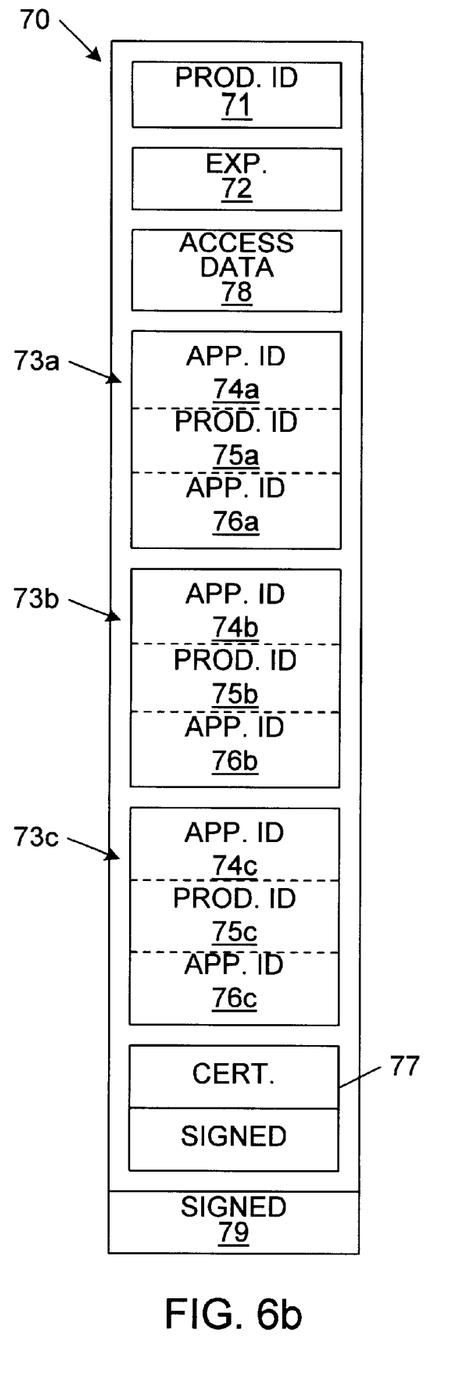
FIG. 6b is a block diagram illustrating the data structure of a credential used in another embodiment of the invention.

In one embodiment, this problem is addressed by allowing a credential to list a number of grantee applications (by producer ID and application ID) and one or more grantor applications. For example, as shown in FIG. 6b, a credential may include a single grantor producer ID 71, an expiration date 72 and permission data 78. The credential may then list several series of IDs 73a–73c, each series having a grantor application ID 74, a grantee producer ID 75 and a grantee application ID 76. Each of the series of information thus identifies one grantor application/carousel owned by the grantor producer and one application which is authorized to access the identified grantor application. The grantee application is, as described above, identified by a grantee producer ID 75 and a grantee application ID 76. The credential contains a signed producer certificate 77 for authentication purposes and the whole credential is signed 79 in the same manner as the previously described credential.

One embodiment employs wildcards to further reduce the potential number of credentials which must be maintained for a given carousel. The grantee's producer or application IDs or the grantor carousel's application ID may be replaced with wildcards. The wildcards are specific IDs which have been predefined as wildcards. For example, an ID having all zeros or all ones may be defined to be a wildcard. When a credential is presented to the system for verification, a wildcard is considered to identically match all IDs with which it is compared. In this embodiment, the grantor's producer ID cannot be a wildcard because the system must be able to verify that the grantor was actually the producer of the credential. If the grantor application ID is a wildcard, then the specified grantee can access all of the grantor producer's carousels. If the grantee application ID is a wildcard, any carousel of the specified grantee (producer) can access the specified grantor carousel(s). If both the grantee producer ID and the grantee application ID are wildcards, any carousel can access the specified grantor carousel. Wildcards can be used with either of the credentials described above (i.e. the single grantor, single grantee credential or the multiple grantor/grantee credential.)

While the embodiment described above utilizes credentials at the level of the carousel, it is contemplated that alternate embodiments may implement credentials or other security measures at the module level. Alternative security measures may include encrypting the modules, performing a hash function over the modules and including the hash value in the corresponding directory module or the like. Credentialing or other security in the directory module would typically be implemented after the insertion of, for example, the other modules' hash values in the directory module.

It is contemplated that encryption systems similar to those described above for accesses between carousels may also be employed for purposes of verifying the authenticity of carousels or modules received by a set-top box. A carousel (or more particularly its directory module) may contain a certificate encrypted with the private key of the producer. The set-top box, having a copy of the producer's public key, can verify that the carousel came from the producer by decrypting the certificate using the public key. The use of hash functions as described above may also be employed to ensure the authenticity of the non-directory modules.

Further, it is contemplated that the credential system described above can be extended to the execution of applications in environments other than interactive television. For example, the system may be implemented in a general purpose desktop computer to control the execution of applications thereon. Such alternative embodiments could operate in the same manner as it is described above, although the means for delivery of the applications and credentials to the system would be adapted to suit the particular environment, and the output of the applications might not be interactive or suitable for display on a television.

The details of the particular embodiments described above may be modified without departing from the spirit and scope of the invention as defined by the appended claims. The embodiments described above are accordingly intended to be exemplary rather than limiting. It is contemplated that various modifications and alternative embodiments will be apparent to those skilled in the art of the invention.

What is claimed is:

1. A method for controlling functions of interactive television applications in an interactive television system, the method comprising:

loading in said interactive television system an interactive television application having a credential associated therewith, said credential including information identifying one or more functions;

verifying said credential;

when said interactive television application attempts to perform said one or more functions, allowing said interactive television application to perform said one or more functions if said information indicates permission to perform said one or more functions.

2. The method of claim 1 further comprising storing said information if said credential is valid.

3. The method of claim 1 wherein said credential contains an expiration date and wherein said step of verifying said credential further comprises determining whether said expiration date has passed.

4. The method of claim 1 wherein said information identifying said one or more functions comprises a producer ID and an application ID identifying said interactive television application.

5. The method of claim 4 wherein one or more of said producer ID and said application ID is a wildcard.

6. The method of claim 1 wherein at least a portion of said credential is encrypted to enable verification of the authenticity of said credential.

7. The method of claim 6 wherein said credential includes a producer's certificate, said producer's certificate comprising a public encryption key, said public encryption key being signed by a trusted party, and wherein said credential is signed with a private encryption key.

8. The method of claim 1 wherein said step of transmitting comprises combining said modules of said first carousel, said modules of said second carousel and a television program into a single signal and broadcasting said signal to said interactive television receiver.

9. The method of claim 8 wherein said interactive television system comprises a broadcast station and a receiving station, the method further comprising transmitting said interactive television application from said broadcast station to said receiving station.

10. A device in an interactive television system for controlling functions attempted by an interactive television application, comprising:

a receiver configured to receive a broadcast interactive television signal containing said interactive television application, said interactive television application having a credential associated therewith;

a data storage device for storing said interactive television application and said credential;

a control unit configured to verify said credential, said control unit being further configured to allow said interactive television application to perform a function if said credential is valid and to prevent said interactive television application from performing said function if said credential is not valid.

11. The device of claim 10 comprising a set-top box.

12. The device of claim 10 wherein said interactive television application is broadcast as part of an interactive television signal which contains audio and video information associated with a television program.

13. The device of claim 12 wherein said credential is delivered to said receiver independent of said interactive television application.

14. The device of claim 12 wherein said credential includes a certificate and wherein said control unit is configured to authenticate said credential using said certificate.

15. The device of claim 12 wherein said credential includes one or more wildcards.

16. The device of claim 10 wherein said broadcast interactive television signal comprises a direct satellite transmission.

17. The device of claim 10 wherein said credential comprises a producer ID, an application ID, and information identifying one or more permissions.

18. The device of claim 17 wherein said credential further comprises a producer's public encryption key, said key being signed by a trusted party.

19. The device of claim 18 wherein said credential is signed with a producer's private encryption key.

20. An interactive television system configured to control operations performed by an interactive television application, the system comprising:

a broadcast station configured to transmit a broadcast signal containing an interactive television application;

a receiver configured to receive said broadcast signal from said broadcast station, to extract said interactive television application from said broadcast signal and to execute said interactive television application, said receiver being further configured to accept a request from said application to perform an operation and to allow said application to perform said operation if said application has a valid credential.

21. The interactive television system of claim 20 wherein said credential comprises information identifying said interactive television application, said information comprising one or more wildcards.

22. The interactive television system of claim 21 wherein said credential further comprises a producer certificate.

23. A device for executing applications in a controlled manner comprising:

a memory for storing an application and a credential associated with said application, wherein said credential contains data corresponding to one or more permissions, said data indicating whether said application has said one or more permissions; and a control unit configured to execute said application, wherein said control unit is configured to verify whether said application has said one or more permissions and to execute said application in accordance with said one or more permissions.

24. The device of claim 23 wherein said control unit comprises a general-purpose computer.

25. The device of claim 24 wherein said credential comprises one or more wildcards.

26. The device of claim 25 wherein said credential further comprises a certificate by which the authenticity of said credential can be verified.

* * * * *